(12) United States Patent
Gupta et al.

(10) Patent No.: US 7,808,963 B2
(45) Date of Patent: Oct. 5, 2010

(54) WIRELESS DELIVERY OF NON-STANDARD FRAME FIELD INFORMATION VIA BROADCAST FRAMES

(75) Inventors: Puneet Gupta, Bangalore (IN); Saurabh Aggarwala, Lucknow (IN); Kartik Muralidharan, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 950 days.

(21) Appl. No.: 11/615,546

(22) Filed: Dec. 22, 2006

(65) Prior Publication Data

US 2007/0160026 A1    Jul. 12, 2007

(30) Foreign Application Priority Data

Dec. 26, 2005   (IN)   ................. 1925/CHE/2005

(51) Int. Cl.
   *H04B 7/216* (2006.01)
(52) U.S. Cl. ...................................................... 370/342
(58) Field of Classification Search .................. 370/342
   See application file for complete search history.

(56) References Cited

U.S. PATENT DOCUMENTS 7,583,684 B2 *   9/2009   Cheng ......................... 370/401

2006/0142034 A1 *   6/2006   Wentink et al. ............. 455/515

OTHER PUBLICATIONS

Jim Geier, "802.11 Beacons Revealed," <http://www.wi-fiplanet.com/tutorials/article.php/1492071>, 6 pages (Oct. 31, 2002).
Jim Geier, "Understanding 802.11 Frame Types," <http://www.wi-fiplanet.com/tutorials/article.php/1447501>, 6 pages (Aug. 15, 2002).
Wikipedia, "IEEE 802.11," <http://en.wikipedia.org/wiki/IEEE_802.11>, 10 pages (accessed Dec. 6, 2006).
Wikipedia, "Wi-Fi," <http://en.wikipedia.org/wiki/Wi-Fi>, 10 pages (accessed Dec. 6, 2006).

* cited by examiner

*Primary Examiner*—Vincent P Harper
*Assistant Examiner*—Timothy Pham
(74) *Attorney, Agent, or Firm*—Klarquist Sparkman, LLP

(57) ABSTRACT

Delivery of non-standard frame field information can be accomplished by publicly broadcasting the non-standard frame field information in one or more broadcast frames within an open wireless computing network. The broadcast can be received by a client wireless device when the client wireless device has not established a connection to the wireless network. The client can store the received information. A system for delivery of non-standard frame field information can comprise a special-purpose access point configured to deliver the information by broadcasting the information in a plurality of broadcast frames. The system can also comprise a client wireless device that receives the broadcast and aggregates the received information when the client is not connected to a wireless network.

14 Claims, 9 Drawing Sheets

US 7,808,963 B2

WIRELESS DELIVERY OF NON-STANDARD FRAME FIELD INFORMATION VIA BROADCAST FRAMES

BACKGROUND

Computing devices have traditionally communicated with each other using wired networks. However, with the increasing demand for mobile computing devices, such as laptops, personal digital assistants (PDAs), and the like, wireless computing networks have developed as a way for computing devices to communicate with each other through wireless transmission.

Wired networks generally comprise computing devices interconnected by physical cables, such as coax, twisted pair, or fiber optic cabling. A wired computer network can be called a local area network (LAN).

Wireless networks, such as 802.11 wireless networks, generally comprise one or more access points. The access points provide wireless connectivity to the wireless network by accepting connections from wireless devices, such as wireless-enabled laptops, PDAs, cell phones, and the like. Access points identify themselves by broadcasting a service set identifier (SSID). Before an 802.11 wireless device can access an 802.11 wireless network, the wireless device must connect to an access point of the wireless network. In order to connect to an access point, the wireless device exchanges information, such as security information, with the access point and completes the connection. It can take some time to complete the connection process.

Once a wireless device is connected to an access point of an 802.11 network, additional configuration steps may be required before the wireless device can send and receive information, such as email or web pages. For example, the wireless device typically has to obtain an Internet Protocol (IP) address.

Therefore, there exists ample opportunity for improvement in technologies related to connectionless delivery of information in wireless networks.

SUMMARY

A variety of technologies related to delivery (e.g., connectionless delivery) of non-standard frame field information can be applied. For example, non-standard frame field information can be delivered over an open wireless communication network by publicly broadcasting (e.g., by a special-purpose access point) the non-standard frame field information in one or more broadcast frames. The publicly broadcast non-standard frame field information can be received by one or more client wireless devices even though the one or more client wireless devices have not established a connection to the open wireless communication network. The one or more client wireless devices can store the non-standard frame field information. Client wireless devices can aggregate frame field information broadcast across multiple broadcast frames.

Non-standard frame field information can be broadcast in SSID fields of beacon frames by a special-purpose access point. The non-standard frame field information can be fragmented and encapsulated within SSID fields of multiple beacon frames. The non-standard frame field information can be information relating to a plurality of information channels.

A system for connectionless delivery of non-standard frame field information over an open wireless computing network can be provided. The system can comprise a special-purpose access point configured to deliver the non-standard frame field information by broadcasting the information in one or more broadcast frames. A client wireless device can receive the broadcast from the special-purpose access point even though the client wireless device has not established a connection to the special-purpose access point. The client wireless device can aggregate the received non-standard frame field information.

Frame field information can be delivered over an open wireless computing network. For example, a client wireless device can receive frame field information broadcast in a plurality of broadcast frames by a special-purpose access point where the client wireless device has not established a connection with the special-purpose access point. The client wireless device can aggregate and store the received frame field information.

The foregoing and other features and advantages of the invention will become more apparent from the following detailed description, which proceeds with reference to the accompanying figures.

DETAILED DESCRIPTION OF EXEMPLARY EMBODIMENTS

Example 1

Exemplary Open Wireless Computing Network

Figure 1:
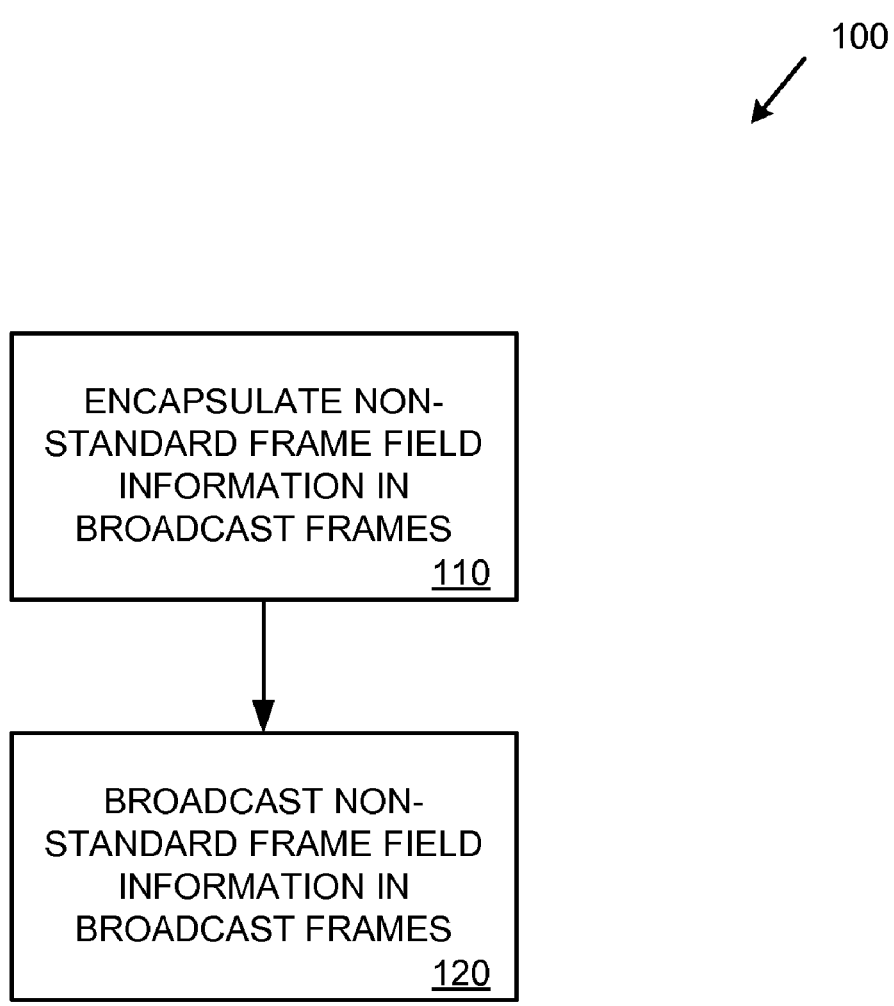
FIG. 1 is a diagram showing an exemplary method for broadcasting non-standard frame field information.

In any of the examples herein, an open wireless computing network can be a wireless network based on the IEEE 802.11 standards, such as 801.11a, 802.11b, 802.11g, 802.11n, etc. A wireless network based on the IEEE 802.11 standards can also be referred to as a WI-FI wireless network (Wi-Fi is a registered trademark of the Wi-Fi Alliance).

An open wireless computing network can be used for connectionless delivery of non-standard frame field information. For example, non-standard frame field information can be encapsulated in management frames and broadcast to client wireless devices via the open wireless computing network.

An open wireless computing network can comprise various components. An open wireless computing network can include wireless network adapters. For example, wireless network adapters can include wireless cards (e.g., WI-FI cards) in computers, PDAs, cell phones, smart phones, or other computing devices. Wireless network adapters can be built-in (e.g., a PDA with built-in, or integrated, wireless capability) or added (e.g., a laptop with a wireless network adapter card).

Existing open wireless computing networks can be used for connectionless delivery of non-standard frame field information. For example, standard wireless access points and standard client wireless devices can include custom software and/or firmware. Access points (e.g., standard 802.11 access points) that include custom software and/or firmware (e.g., special-purpose access points) can deliver non-standard frame field information by broadcasting the information in management frames. Non-standard frame field information can also be delivered by other types of devices (e.g., a standard computer with a wireless network adapter that has been configured via software to broadcast the non-standard frame field information). Client wireless devices (e.g., client wireless devices comprising standard 802.11 wireless network adapters) can receive non-standard frame field information received in management frames.

In this way, existing open wireless computing network, such as existing 802.11 or WI-FI wireless networks, can be used to deliver non-standard frame field information without additional investment in hardware and infrastructure. Custom software or firmware can be added to existing 802.11 or WI-FI wireless networks and devices to provide for the functionality described in any of the examples herein.

Example 2

Exemplary Non-Standard Frame Field Information

In any of the examples herein, non-standard frame field information is any information in 802.11 frame fields that is non-standard information. Non-standard frame field information can be dynamic information, or end-user data, that is encapsulated within an 802.11 broadcast frame field that, according to an 802.11 standard, contains another type of information. Information that is encapsulated within an 802.11 broadcast frame field that, according to an 802.11 standard, contains another type of information, can also be called nonconforming frame field information or proprietary frame field information. For example, if an 802.11 broadcast frame field ordinarily contains control information, such as a timestamp, beacon interval, or service set identifier (SSID), then non-standard frame field information for such fields would be information that is not a timestamp, beacon interval, or SSID. Non-standard frame field information can be information that is encapsulated in a broadcast frame field that ordinarily contains static control information. For example, the SSID frame field of the beacon frame subtype of the management frame contains an SSID. Encapsulating information other than an SSID in the SSID frame field of the beacon frame would be non-standard frame field information.

Non-standard frame field information can include information relating to various services (e.g., computing services) offered via an open wireless computing network. For example, the non-standard frame field information can include quality of service information (e.g., quality of service parameters) relating to the quality of service of various components or devices of the open wireless computing network (e.g., the quality of service of access points). The non-standard frame field information can also include information relating to other types of services, such as available restaurants or stores at a specific location (e.g., an airport or shopping mall). The non-standard frame field information can convey other types of information such as messages, alerts, security information, location-based services, or any other type of information.

For example, an alert can be displayed on a client wireless device when the client wireless device receives broadcast non-standard frame field information. Alerts can be displayed in a variety of formats. For example, an alert can be a pop-up window on a display of a client wireless device. An alert can also be a bubble notification. Alerts can also include other techniques of notification, such as an audible notification (e.g., an audible beep or ring) or a visual notification (e.g., a blinking or flashing light). Alerts can contain a variety of information. For example, an alert can contain text, pictures, multimedia (e.g., audio and video), links (e.g., links to Web sites), and other types of information.

Example 3

Exemplary Information Channel

In any of the examples herein, an information channel can identify a type or category of non-standard frame field information. Some examples of information channels can be: quality of service channels, control channels, current location services (e.g., shopping mall services), messaging channels, alert channels, targeted information channels (e.g., information specific to a client wireless device or a group of client wireless devices), and advertising services.

Information channels can be numbered. For example, information channel 1 can be a control channel, information channel 2 can be a quality of service channel, information channel 3 can be a messaging channel, and channel 4 can be an advertising channel. Information channel numbers can be pre-set (e.g., pre-configured in software or firmware of special-purpose access points and client wireless devices). Information channel numbers can also be dynamic. For example, a specific information channel (e.g., information channel 1, which can be called a control channel) can contain non-standard frame field information describing available information channels and respective information channel numbers. Based on a control channel, a client wireless device can decide to listen only to specific information channels (e.g., only process non-standard frame field information relating to one or more of the available information channels).

Example 4

Exemplary Broadcasting Non-Standard Frame Field Information

In any of the examples herein, non-standard frame field information can be broadcast. For example, non-standard frame field information can be broadcast in a broadcast frame. Non-standard frame field information that is too large to fit in a single broadcast frame can be fragmented across multiple broadcast frames.

For example, an 802.11 management frame can be used to broadcast non-standard frame field information. The non-standard frame field information can be broadcast by encapsulating the non-standard frame field information in a frame field of the management frame. For example, non-standard frame field information can be encapsulated in a SSID field of the management frame (e.g., in a SSID field of a beacon frame subtype of the management frame type). Other management frame types and fields can also be used to broadcast non-standard frame field information.

Non-standard frame field information can be publicly broadcast by broadcasting the non-standard frame field information in a broadcast frame that is directed to all client wireless devices in range of the broadcast. For example, the beacon frame (the beacon frame subtype of the management frame type) is a broadcast frame that is directed to all client wireless devices in range because the beacon frame is not targeted to a specific (or a group of specific) client wireless devices. The beacon frame can be received and processed by any or all client wireless devices in range of the broadcast even if the client wireless device is not connected (e.g., has not established a connection) with the wireless network. The beacon frame can also be received and processed by client wireless devices that are connected to the wireless network.

Example 5

Exemplary Broadcast Periods and Cycles

In any of the examples herein, non-standard frame field information can be broadcast over periods and cycles. A period can be defined as broadcasting one broadcast frame (e.g., comprising one fragment) of all information channels. A cycle can be defined as broadcasting all periods required to broadcast all broadcast frames of all information channels.

For example, a special-purpose access point can broadcast non-standard frame field information related to three information channels. Information channel 1 can be a quality of service information channel, information channel 2 can be a local store information channel, and information channel 3 can be an advertising information channel. The non-standard frame field information for each information channel can be fragmented across multiple broadcast frames (e.g., because it is too large to fit into a single broadcast frame). For example, the quality of service non-standard frame field information can be split into 10 fragments and broadcast in 10 broadcast frames (e.g., in SSID fields of 10 beacon frames). Similarly, the local store information can be fragmented across 15 broadcast frames, and the advertising information can be fragmented across 12 broadcast frames.

Using this example, in order for the special-purpose access point to complete a broadcast period, the special-purpose access point would broadcast the first fragment of each of the three information channels (i.e., the first fragment of information channel 1, followed by the first fragment of information channel 2, and finally followed by the first fragment of information channel 3). Once the special-purpose access point completes a broadcast period, the special-purpose access point will broadcast the next fragment of each of the three information channels. Once the special-purpose access point completes broadcasting all fragments of all information channels (i.e., completes broadcasting all periods), a broadcast cycle has been completed. Once completing a broadcast cycle, the special-purpose access point can begin the broadcast cycle over again. In this way, the special-purpose access point can continuously broadcast the non-standard frame field information.

If the non-standard frame field information is broadcast in a beacon frame field (e.g., the SSID field), then the length of time it takes to broadcast one beacon frame is the beacon frame interval (e.g., 100 ms). If there are N information channels to broadcast, if each information channel includes F fragments (F beacon frames), and if the beacon frame interval is T, then the cycle time can be calculated using the formula below:

$$\text{Cycle time} = \sum_{i=1}^{N} F_i \cdot T$$

Multiplexing the broadcast of information channels can refer to broadcasting a specific fragment of a number of information channels and then moving to the next fragment (e.g., broadcasting a first fragment of three information channels via three broadcast frames followed by a second fragment, etc.). A multiplexing broadcast scheme using periods and channels can help enforce fairness. For example, each period includes a broadcast frame of each information channel (unless all fragments of an information channel have already been broadcast for the cycle).

New information channels can be added to the broadcast cycle. For example, a new information channel can be added at the beginning of a broadcast cycle, or at a different point in the broadcast cycle (e.g., at the beginning of a period). An information channel can be removed from the broadcast cycle (e.g., at the end of the cycle or at a different point in the broadcast cycle).

A round robin scheme can be used to alternate the starting point of information channels in a period or cycle. For example, each period can begin with the next information channel (e.g., if one period begins with information channel 1, then the next period can begin with information channel 2).

Example 6

Exemplary Format for Non-Standard Frame Field Information

In any of the examples herein, non-standard frame field information can be encapsulated in a frame field using a variety of formats. A format can provide a logical structure for the non-standard frame field information. A format for encapsulating the non-standard frame field information can allow for the non-standard frame field information to be encapsulated in one frame or split (fragmented) across more than one frame.

Example 7

Exemplary Wireless Network Zone

In any of the examples herein, a wireless network zone can be a zone created by an access point of an open wireless computing network. For example, a wireless network zone can be an area (e.g., a physical or geographic area) related to the communication range of a wireless adapter of the access point. For example, a wireless network adapter can have a range within which it can communicate with other wireless network adapters. For example, the range can cover an area with a 150 to 300 foot radius centered at the wireless network adapter. The range of a wireless network adapter can be affected by various conditions, such as environmental factors, transmission power, interference, and the like. One or more wireless network zones can be supported by a single wireless network adapter. A wireless network zone can also be known as a hotspot.

Non-standard frame field information can be delivered within a wireless network zone by broadcasting the non-standard frame field information within the wireless network zone. Client wireless devices located within the wireless network zone can listen for, and receive, the broadcast non-standard frame field information.

Example 8

Exemplary Client Wireless Device

In any of the examples herein, a client wireless device can be a computing device that is capable of wireless communication via an open wireless computing network. For example, a client wireless device can be a computer (e.g., a laptop, desktop, or tablet computer), a PDA, a mobile communications device (e.g., a cell phone or a smart phone), or another type of computing device with a built-in or add-on wireless network adapter (e.g., an 802.11 or WI-FI wireless network adapter). For example, a client wireless device can be a laptop or PDA with an 802.11b or 802.11g wireless network adapter. Client wireless devices can be mobile or stationary.

Non-standard frame field information can be delivered to client wireless devices. For example, non-standard frame field information can be delivered to client wireless devices by broadcasting the non-standard frame field information over an open wireless computing network. Client wireless devices can receive the broadcast non-standard frame field information.

A client wireless device can receive non-standard frame field information when the client wireless device is not connected to an open wireless computing network. For example, a client wireless device can be located within a wireless network zone of an access point of the open wireless computing network. Even though the client wireless device has not established a connection to the open wireless computing network (e.g., the client wireless device has not connected to the access point), the client wireless device can nevertheless receive non-standard frame field information that is broadcast, in a broadcast frame, from the wireless access point (or from another wireless broadcast device).

A client wireless device can automatically receive non-standard frame field information. For example, a client wireless device automatically, without user intervention, receives non-standard frame field information broadcast by an access point (e.g., a special-purpose access point) of an open wireless computing network when the client wireless device has not established a connection with the open wireless computing network (e.g., when the client wireless device has not established a connection with an access point of the open wireless computing network).

A client wireless device can scan (e.g., continuously scan) for non-standard frame field information that is broadcast within an open wireless computing network. Scanning can be automatic (e.g., a client wireless device can continuously scan without any intervention by the user). When the client wireless device detects such a broadcast, the client wireless device can receive (e.g., automatically or in response to user input) the broadcast non-standard frame field information.

A client wireless device that receives broadcast frame field information (e.g., non-standard frame field information) can perform various functions. For example, the client wireless device can aggregate and/or store the received non-standard frame field information. The client wireless device can display a visual or auditory representation based at least in part on the non-standard frame field information. The client wireless device can also connect to access points, initiate alerts, or perform other functions based at least in part on the non-standard frame field information. These various functions can be performed automatically by the client wireless device (e.g., without user intervention), or they can involve user intervention.

Example 9

Exemplary Access Point

In any of the examples herein, an access point (AP), also called a wireless access point (WAP), can be a wireless device that connects client wireless devices together to form an open wireless computing network. An access point can be an 802.11 or WI-FI access point.

A typical 802.11 of WI-FI access point can be called a standard access point. A standard access point can be an access point configured to operate according to an 802.11 or WI-FI standard (e.g., 802.11a, 802.11b, and/or 802.11g standards). A standard access point can also be a standard computing device that operates as a standard access point (e.g., a computer with a wireless network adapter operating as an access point).

An access point can deliver frame field information (e.g., non-standard frame field information) by broadcasting the frame field information (e.g., the non-standard frame field information) over the open wireless computing network. An access point that has been configured to deliver frame field information (e.g., non-standard frame field information) can be called a special-purpose access point. A special-purpose access point can be a standard access point (e.g., comprising a standard 802.11 wireless network adapter) that has been configured (e.g., via software or firmware) to deliver frame field information (e.g., non-standard frame field information). For example, a special-purpose access point can be configured to encapsulate non-standard frame field information in a frame field of a broadcast frame (e.g., in a SSID field of a beacon frame). A special-purpose access point can deliver non-standard frame field information by broadcasting the non-standard frame field information in a wireless network zone of the special-purpose access point.

A client wireless device (e.g., that has not established a connection to a wireless network, or to any access point of the wireless network) can receive broadcast frame field information broadcast in multiple broadcast frames (e.g., broadcast in SSID fields of beacon frames) from a special-purpose access point and aggregate and the received frame field information.

Example 10

Exemplary Applications and Advantages

In any of the examples herein, delivery (e.g., connectionless delivery) of non-standard frame field information can have many applications. Example applications can include: load balancing in a wireless network (e.g., without need for centralized and complex management infrastructure), monitoring security breaches and vulnerabilities, transmitting information to large number of wireless devices (e.g., without scalability issues), location-aware and location-based services, messaging services, alert services, advertising services, and enabling push-based transactions. Delivery (e.g., connectionless delivery) of non-standard frame field information can also provide many advantages. Example advantages can include: the ability to avoid time and overhead required to establish a connection before delivering information, the ability to introduce additional functionality in an existing 802.11 wireless network using standard 802.11 wireless devices (e.g., using only software modifications), the ability to support additional avenues of communication that can operate independently of existing avenues of communication, and the ability to address issues related to time-sensitive transactions where there may not be sufficient time to first establish a connection.

Requiring client wireless devices to establish connections before sending and receiving information with an 802.11 wireless network, and the length of time required to establish an 802.11 connection, can be an inefficient use of wireless network resources. Certain types of communications can benefit if connections are not required. Some examples of such communications that can benefit from connectionless delivery of information can include: communicating a small amount of information, communicating non-sensitive information, communicating the same information to a large number of client devices, and communicating information that is time critical.

Example 11

Exemplary Method for Broadcasting Non-Standard Frame Field Information

FIG. 1 shows an exemplary method 100 for broadcasting non-standard frame field information. The method 100 can be used for connectionless delivery of non-standard frame field information by broadcasting the non-standard frame field information to unconnected client wireless devices (e.g., client wireless devices that have not established a connection). Connected client wireless devices can also receive broadcast non-standard frame field information.

At 110, non-standard frame field information is encapsulated in broadcast frames. For example, the non-standard frame field information can be encapsulated in a management frame (e.g., in a beacon frame subtype of the management frame type). For example, the non-standard frame field information can be encapsulated in SSID fields of beacon frames.

The non-standard frame field information can be fragmented and encapsulated within more than one broadcast frame. For example, a format can be used to encapsulate the non-standard frame field information (e.g., a format such as that depicted in FIG. 5).

At 120, the non-standard frame field information (that has been encapsulated in the broadcast frames) is broadcast. For example, the broadcast frames can be broadcast within an open wireless computing network by an access point (e.g., by a special-purpose access point). The non-standard frame field information can be broadcast within one or more wireless network zones.

Client wireless devices can receive the non-standard frame field information by receiving the broadcast. If the non-standard frame field information is broadcast in more than one broadcast frame, then the client wireless devices can aggregate (e.g., extract and combine) the non-standard frame field information.

Example 12

Exemplary Method for Delivering Non-Standard Frame Field Information

Figure 2:
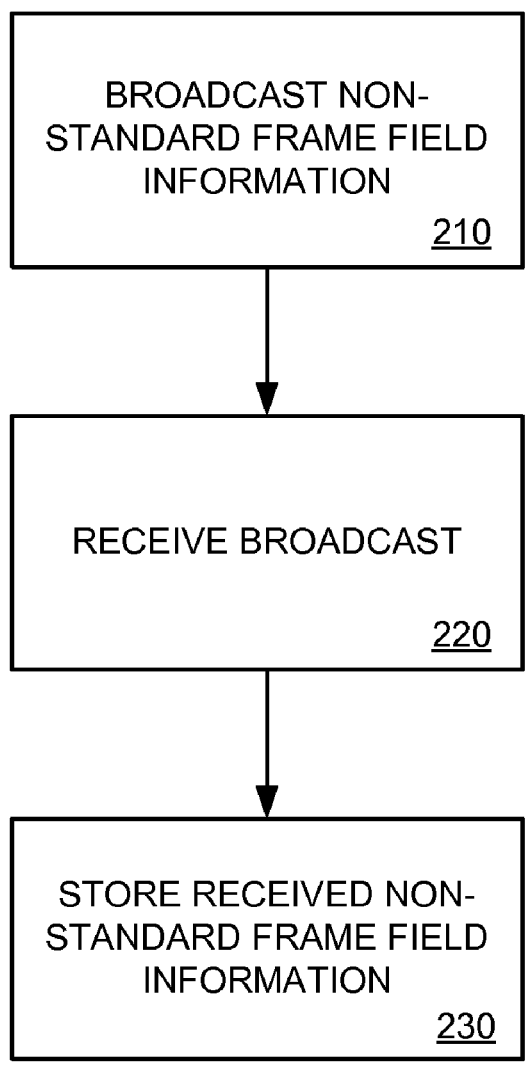
FIG. 2 is a flowchart showing an exemplary method for delivering non-standard frame field information.

FIG. 2 shows an exemplary method 200 for delivering non-standard frame field information. The method 200 can be used for connectionless delivery of non-standard frame field information by broadcasting the non-standard frame field information to unconnected client wireless devices (e.g., client wireless devices that have not established a connection). Connected client wireless devices can also receive the broadcast non-standard frame field information.

At 210, non-standard frame field information is broadcast, in broadcast frames, within an open wireless computing network. For example, the non-standard frame field information can be broadcast by a special-purpose access point within the open wireless computing network (e.g., within a wireless network zone) to one or more client wireless devices (e.g., client wireless devices within the wireless network zone). The non-standard frame field information can be broadcast in a single broadcast frame or split (e.g., fragmented) across more than one broadcast frame.

At 220, the broadcast non-standard frame field information is received by the client wireless devices. For example, the client wireless devices can receive the broadcast when the client wireless devices are within a wireless network zone of a special-purpose access point. The client wireless devices can receive the broadcast when the client wireless devices have not established a connection to an access point.

At 230, the received non-standard frame field information is stored by the client wireless devices. A client wireless device can store the received information in a variety of ways. For example, the client wireless device can store the information in memory (e.g., random access memory (RAM), flash memory, or other types of memory) or in another storage facility (e.g., on a hard drive, flash device, or other removable or fixed storage media). The client wireless device can store the received information in volatile storage (e.g., temporarily to allow the client wireless device to display a representation of the received information) or in non-volatile storage (e.g., permanently on a hard drive).

The method 200 can be used for connectionless delivery of non-standard frame field information by broadcasting the information in broadcast frames. With 802.11 or WI-FI wireless networks, a non-connected client wireless device cannot receive information other than standard control or connection-oriented information used to connect to the wireless network (e.g., SSID information). By leveraging broadcast frames (e.g., beacon frames), and encapsulating non-standard frame field information (e.g., in SSID fields of the beacon frames), any type of non-standard frame field information can be delivered to client wireless devices even though the client wireless devices have not established a connection to the wireless network (e.g., the client wireless devices are not connected to an access point of the wireless network).

Example 13

Exemplary System for Delivering Non-Standard Frame Field Information

Figure 3:
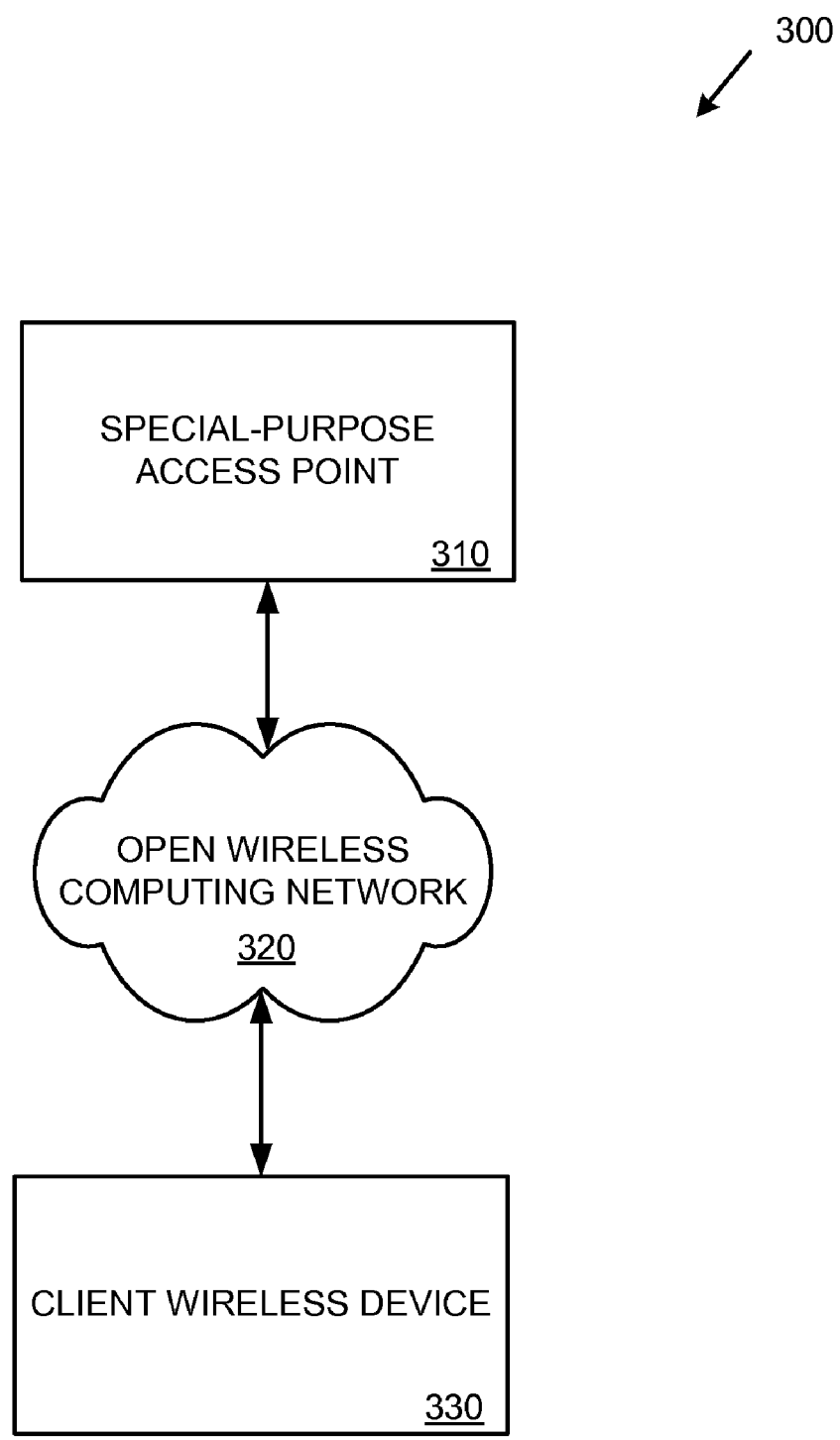
FIG. 3 is a diagram showing an exemplary system for delivering non-standard frame field information.

FIG. 3 shows an exemplary system 300 for delivering non-standard frame field information. In the example system, a special-purpose access point 310 delivers non-standard frame field information by broadcasting the information via an open wireless computing network 320. A client wireless device 330 receives the broadcast non-standard frame field information from the special-purpose access point 310 via the open wireless computing network 320.

The exemplary system 300 can accomplish connectionless delivery of non-standard frame field information. For example, the special-purpose access point 310 can encapsulate the non-standard frame field information in one or more broadcast frames (e.g., beacon frames) and broadcast the broadcast frames via the open wireless computing network 320. Client wireless devices (e.g., 330) can receive the broadcast frames from the special-purpose access point 310 even when the client wireless devices are not connected to the open wireless computing network 320 (e.g., when the client wireless devices have not established a connection with the special-purpose access point 310 or with any other access point, such as standard access points).

Example 14

Figure 4:
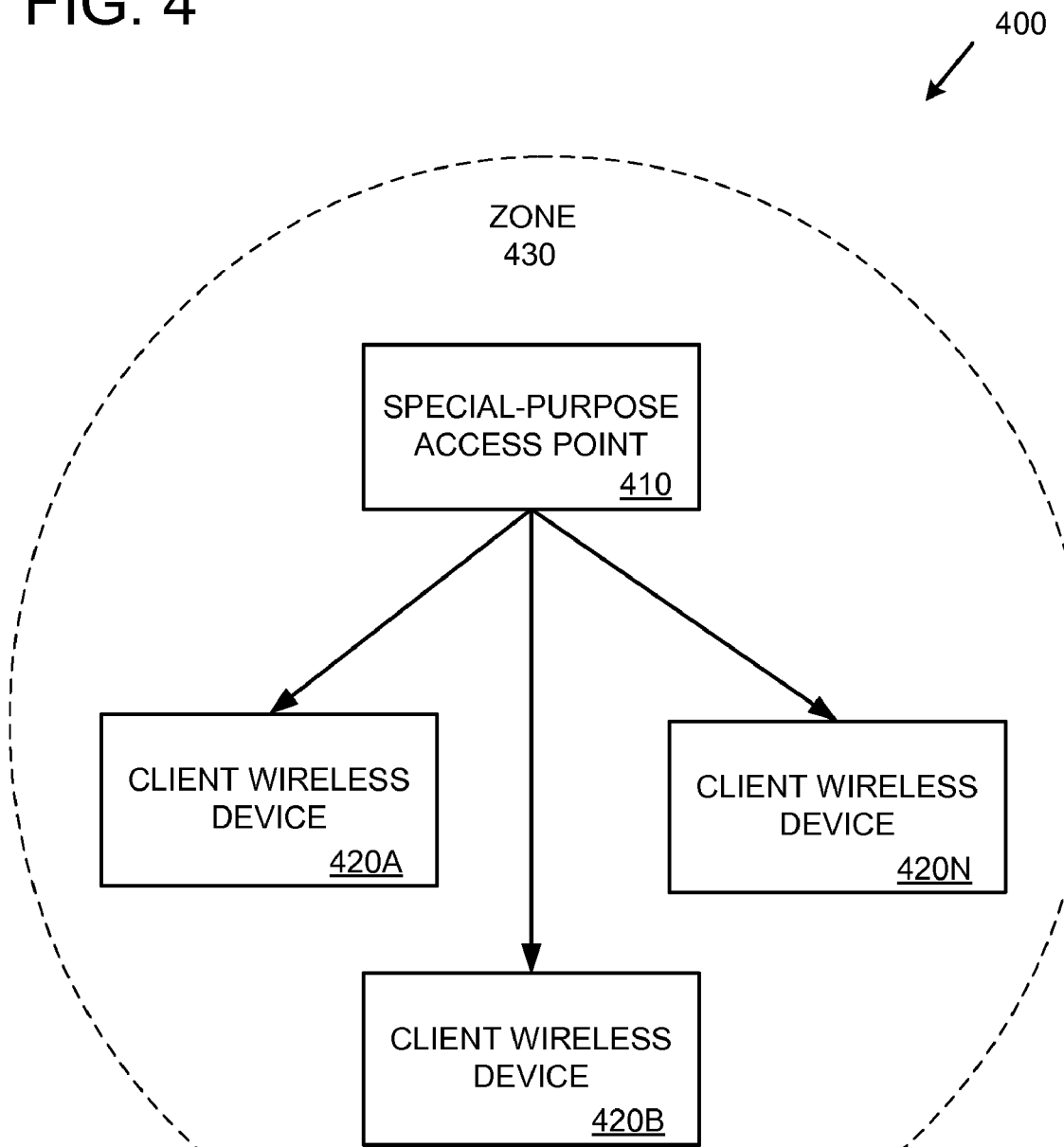
FIG. 4 is a diagram showing an exemplary system for delivering non-standard frame field information within a wireless network zone.

Exemplary System for Delivering Non-Standard Frame Field Information within a Wireless Network Zone FIG. 4 shows an exemplary system 400 for delivering non-standard frame field information within a wireless network zone. In the example system 400, a special-purpose access point 410 delivers non-standard frame field information by broadcasting the information within a wireless network zone 430 of the special-purpose access point 410. Client wireless devices (e.g., 420A-N) receive the broadcast non-standard frame field information from the special-purpose access point 410. The wireless network zone 430 can be a wireless network zone of an open wireless computing network.

The exemplary system 400 can accomplish connectionless delivery of non-standard frame field information. For example, the special-purpose access point 410 can encapsulate the non-standard frame field information in one or more broadcast frames (e.g., beacon frames) and broadcast the broadcast frames within the wireless network zone 430. Client wireless devices (e.g., 420A-N) can receive the broadcast frames from the special-purpose access point 410 even when the client wireless devices (e.g., 420A-N) are not connected to the special-purpose access point 410 or to any other access point.

Example 15

Exemplary Format for Encapsulating Non-Standard Frame Field Information

Figure 5:
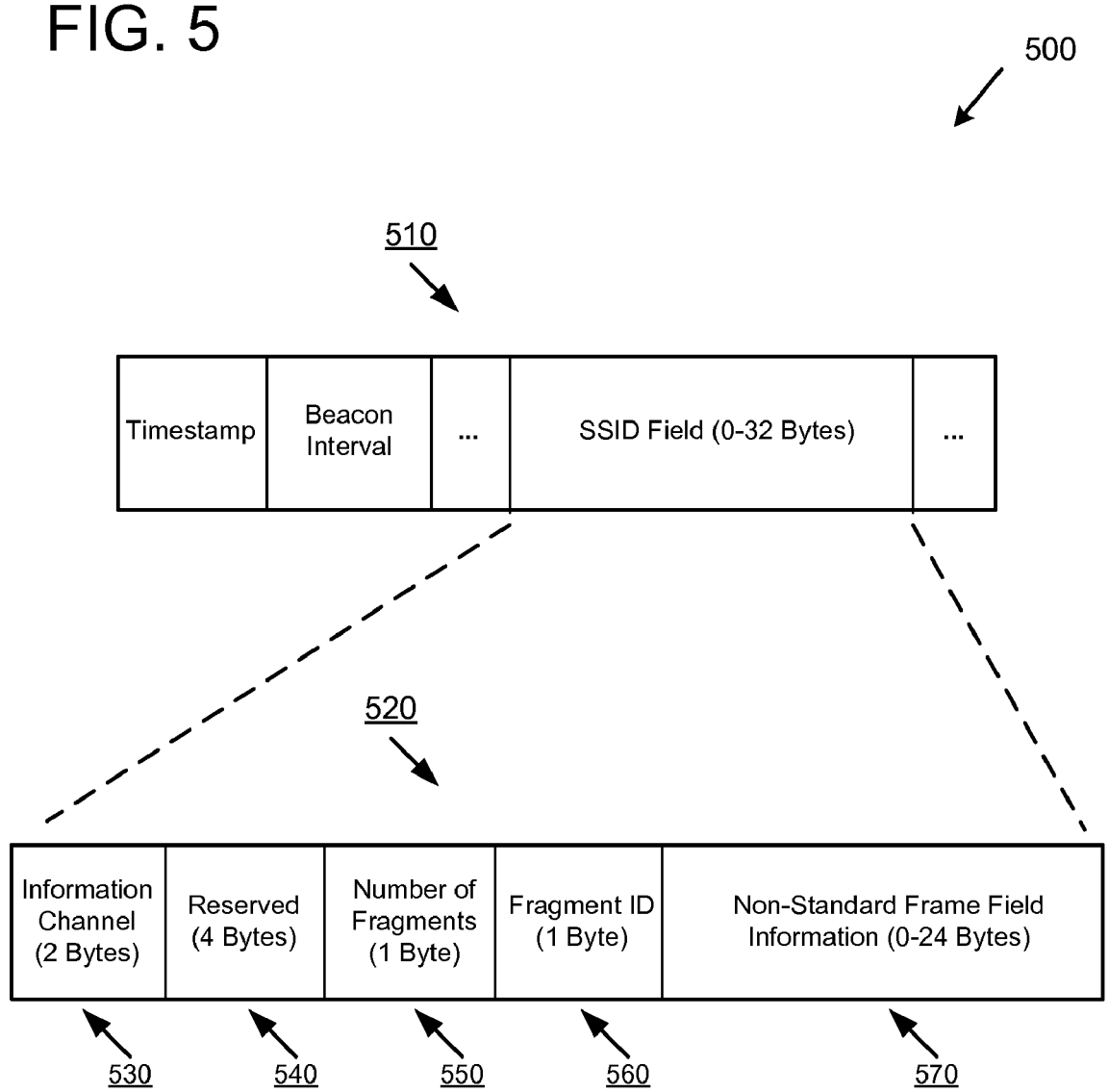
FIG. 5 is a diagram showing an exemplary format for encapsulating non-standard frame field information.

FIG. 5 shows an exemplary format 500 for encapsulating non-standard frame field information. 510 depicts selected fields of a standard 802.11 beacon frame (the beacon frame subtype of the management frame type). One of the beacon frame fields is the SSID field. According to the 802.11 specification, the SSID field of the beacon frame identifies a wireless network. The SSID field contains up to 32 bytes of data.

520 depicts a format that can be used to encapsulate non-standard frame field information in the SSID field of the beacon frame. The fields depicted in the example format 520 are encapsulated within the 32-byte SSID field of the beacon frame 510.

The example format 520 includes a number of fields. The information channel field 530 (a 2 byte field) indicates the information channel of the encapsulated non-standard frame field information. Information channels can be used to define different types or categories of encapsulated non-standard frame field information. For example, one channel can be used to deliver quality of service information. Another channel can be used to deliver information relating to available services (e.g., restaurants or stores). Yet another channel can be used to deliver messages and/or alerts. Other channels can be defined to deliver other types of information.

The reserved field 540 (a 4 byte field) can be used to reserve space for future expansion. For example, additional functionality can be added to the format using the reserved field 540.

The number of fragments field 550 (a 1 byte field) can be used when non-standard frame field information is larger than the available space in a single frame and thus must be fragmented across multiple frames. For example, if the non-standard frame field information is to be fragmented and sent using three broadcast frames, the number of fragments field 550 can be set to "3." Using a 1 byte field provides up to 256 fragments.

The fragment ID field 560 (a 1 byte field) can be used to identify the fragment number of the current broadcast frame. For example, if non-standard frame field information is to be fragmented and sent using three broadcast frames, the first broadcast frame would have its fragment ID field 560 set to "1," the second broadcast frame would have its fragment ID field 560 set to "2," and the third and final broadcast frame would have its fragment ID field 560 set to "3."

The non-standard frame field information field 570 contains the non-standard frame field information. Of the 32 bytes available in the SSID field, up to 24 bytes are available for use in this field using the example format 520. If the non-standard frame field information is larger than 24 bytes, it can be fragmented across multiple frames.

The example format 520 does not guarantee reliable communications (e.g., there is no provision for ensuring that broadcast frames are received). For example, a client wireless device may receive some, but not all, fragments of a particular information channel. However, by continually re-broadcasting (e.g., using periods and cycles), a client wireless device can wait until the next broadcast cycle to receive the missing fragment(s).

Using a "number of fragments" field 550 and a "fragment ID" field 560, a client wireless device receiving non-standard frame field information can aggregate non-standard frame field information that has been fragmented across multiple broadcast frames. For example, once the client wireless device receives all fragments (as defined by the "number of fragments" field 550), the client wireless device can aggregate (e.g., recombine) the non-standard frame field information (in field 570) in the order specified by the "fragment ID" field 560.

The example format 520 depicts one way of encapsulating non-standard frame field information in the SSID field of a broadcast frame. Other formats can also be used while still retaining the functionality of connectionless delivery of non-standard frame field information using broadcast frames. For example, different fields (other than 530-570) can be used (e.g., fields can be left out, such as the information channel field). Different field sizes can be used (e.g., 2 bytes for the "number of fragments" and "fragment ID" fields). Instead of using the SSID field of the beacon frame, other fields of the beacon frame could be used. Similarly, other fields of other broadcast frames (other than the beacon frame) can be used.

Example 16

Exemplary System for Delivering Quality of Service Information

Figure 6:
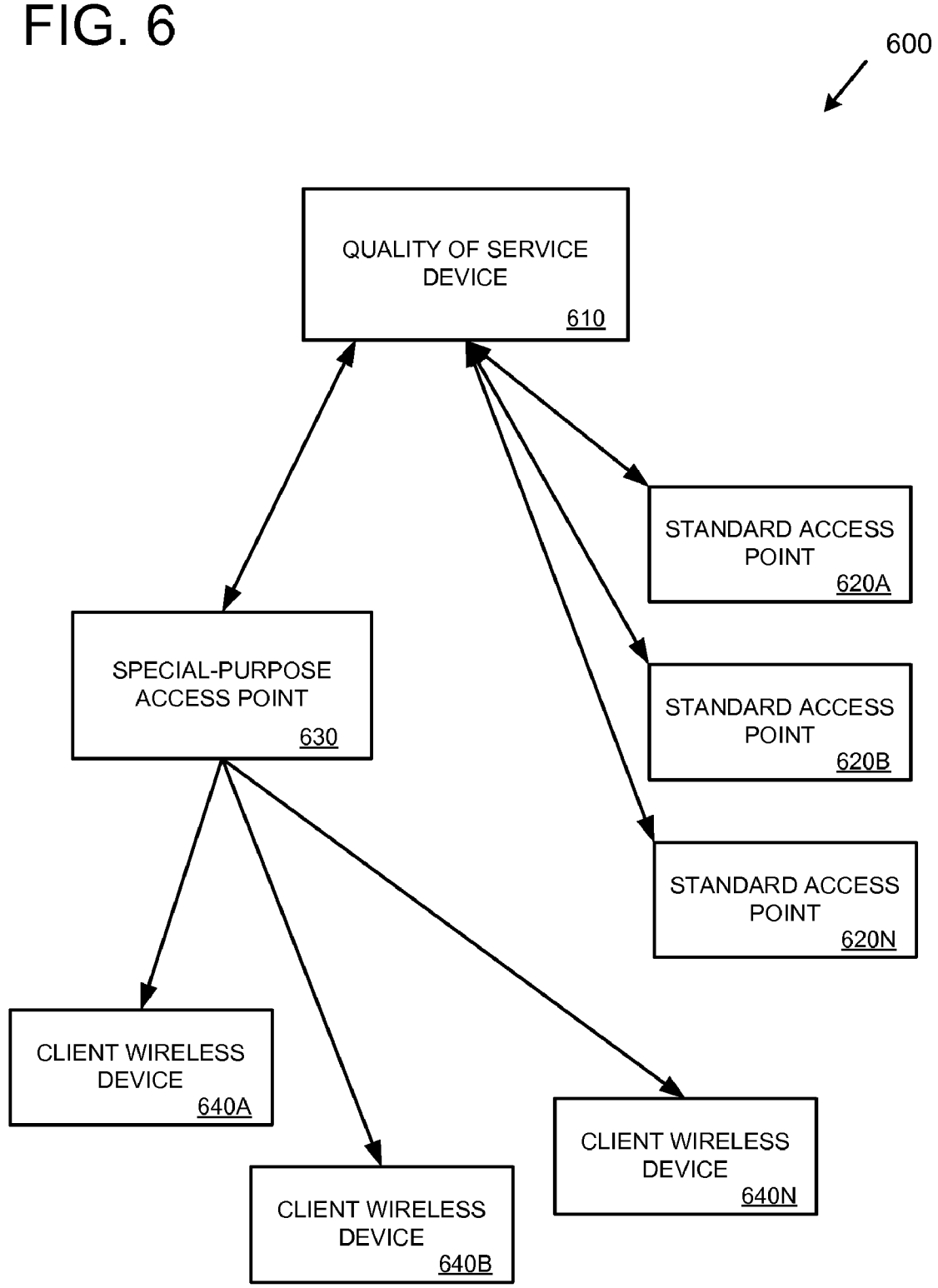
FIG. 6 is a diagram showing an exemplary system for delivering quality of service information.

FIG. 6 shows an exemplary system 600 for delivering quality of service information in an open wireless computing network. The exemplary system includes a quality of service device 610. The quality of service device 610 can be any type of computing device (e.g., a standard server computer running a software application, a specialized computer, a network device, etc.). The quality of service device 610 can collect quality of service information from a variety of sources (e.g., using the simple network management protocol (SNMP)). For example, the quality of service device 610 can collect quality of service information from standard wireless access points (e.g., standard access points 620A-N). Quality of service information collected from standard access points can include quality of service parameters such as number of users, load, throughput, supported services, etc. The quality of service device 610 can collect quality of service information (e.g., quality of service parameters) from other sources instead of, or in addition to, standard access points. For example, quality of service information can be collected from other networking devices (e.g., routers, gateways, hubs), from special-purpose access points (e.g., 630), from computer servers, or from other sources.

The quality of service device 610 can process the collected quality of service information. For example, the quality of service device 610 can combine the collected quality of service information into a quality of service score (e.g., index). The quality of service device 610 can maintain a list of standard access points (e.g., 620A-N) and their associated quality of service scores. The quality of service device 610 can save or store quality of service information (e.g., quality of service scores). The quality of service device 610 can also transmit quality of service information to other devices (e.g., to special-purpose access points, such as 630).

The exemplary system 600 includes a special-purpose access point 630. The special-purpose access point can deliver non-standard frame field information comprising quality of service information to client wireless devices 640A-N. For example, the special-purpose access point 630 can receive (or retrieve) quality of service information (e.g., quality of service parameters or quality of service scores) from the quality of service device 610. The special-purpose access point 630 can then broadcast the quality of service information by encapsulating the quality of service information in broadcast frames (e.g., in SSID fields of beacon frames) to client wireless devices (e.g., 640A-N). The client wireless devices (e.g., 640A-N) can receive the broadcast quality of service information when the client wireless devices (e.g., 640A-N) have not established a connection with the special-purpose access point 630 or with a standard access point (e.g., 620A-N). Connected client wireless devices (e.g., 640A-N) can also receive the broadcast quality of service information.

The exemplary system 600 also includes client wireless devices 640A-N. The client wireless devices 640A-N can receive broadcast quality of service information. Based on the received quality of service information, the client wireless devices 640A-N can make a decision to connect to a specific standard access point (e.g., 620A, 620B, or 620N). The decision can be made based on a quality of service score for the standard access points. For example, the quality of service score can be received in the quality of service information or the client wireless device can calculate the quality of service score from received quality of service information, such as received quality of service parameters.

A system for delivering quality of service information can include a single quality of service device or multiple quality of service devices. A system for delivering quality of service information can also include a single special-purpose access point or multiple special-purpose access points. For example, a single quality of service device can collect quality of service information for use by multiple special-purpose access points. The special-purpose access points can deliver non-standard frame field information within an open wireless computing network of a business, organization, or location (e.g., a university campus, a business location, a building, a shopping mall, an airport, a city, etc.).

Using the exemplary system 600, a client wireless device (e.g., 640A-N) can connect to a standard access point (e.g., 620A-N) with the best quality of service. The client wireless device can receive quality of service information describing the quality of service of the available access points in the area (e.g., 620A-N) without having to connect to any of the access points. Because the client wireless device does not have to connect to an access point to determine the performance of the access point (or the performance of other available access points), the client wireless device does not waste time and resources.

Once the client wireless device (e.g., 640A-N) receives broadcast quality of service information from a special-purpose access point (e.g., 630), the client wireless device can automatically connect to a standard access point (e.g., 620A-N) with the best quality of service. The client wireless device can also present a list of available standard access points (e.g., along with a quality of service indication such as a score or ranking) to a user of the client wireless device (e.g., via a display of the client wireless device). The user can then select one of the displayed available standard access points and initiate the connection.

The exemplary system 600 can be used to load balance a wireless network (e.g., an open wireless computing network). By broadcasting quality of service information describing the quality of service of the available standard access points in the area, non-connected wireless client devices can connect to the standard access point with the best quality of service (e.g., the least loaded standard access point). In this way, when one or more of the standard access points become loaded (e.g., lower response times, lower throughput, and/or many client wireless device connections), new connections can be directed to less loaded standard access points, thus efficiently distributing the load on the wireless network.

The load balancing technique can also be used during handoff of client wireless devices between standard access points. For example, when a client wireless device that is connected to an access point in one area moves to a different area, the client wireless device can receive broadcast quality of service information relating to the quality of service of access points in the new area. The client wireless device can then connect to the access point in the new area (e.g., automatically connect or automatically transition) with the best quality of service.

The exemplary system 600 can also permit client wireless devices (e.g., 640A-N) to dynamically switch connection between standard access points (e.g., 620A-N). For example, a client wireless device (e.g., 640A, 640B, or 640N) connected to a standard access point (e.g., 620A, 620B, or 620N) can receive quality of service information broadcast by a special-purpose access point (e.g., 630). The client wireless device can evaluate the quality of service of the currently connected standard access point and the other available standard access points and decide wither to switch its connection to a different standard access point (e.g., a different standard access point with a better quality of service). For example, a client wireless device can decide to switch to a different standard access point even though the different standard access point does not have a stronger signal, but rather because the different standard access point has a better quality of service based on other quality of service information.

Example 17

Exemplary Method for Connecting to a Standard Access Point

Figure 7:
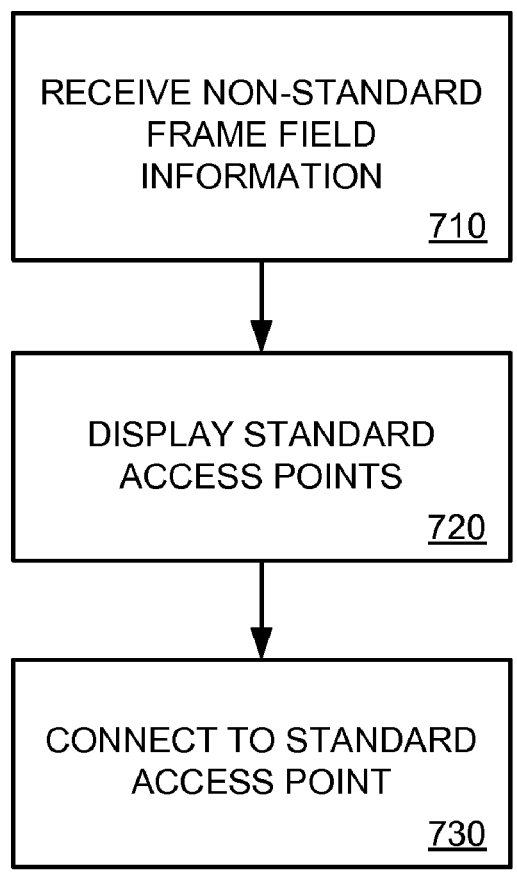
FIG. 7 is a flowchart showing an exemplary method for connecting to a standard access point based on quality of service information.

FIG. 7 shows an exemplary method 700 for connecting to a standard access point based on quality of service information, and can be performed, for example, by a system such as that shown in FIG. 6. At 710, non-standard frame field information comprising quality of service information is received by a client wireless device from a special-purpose access point where the client wireless device has not established a connection to the special-purpose access point. The quality of service information can include quality of service parameters (e.g., number of users connected to standard access points, load of standard access points, and throughput of standard access points).

At 720, the client wireless device displays (e.g., in a list or table format) standard access points for which quality of service information was received. The standard access points can be displayed in a specific order (e.g., from best quality of service to worst). The client wireless device can display quality of service information along with respective standard access points. For example, the client wireless device can display a quality of service rating or ranking for each standard access point.

At 730, the client wireless device connects to one of the standard access points. For example, a user of the client wireless device can select one of the displayed standard access points and initiate the connection (e.g., via a button or link displayed in a user interface of the client wireless device).

Instead of displaying standard access points for which quality of service information is received, the client wireless device can automatically connect to one of the standard access points for which quality of information is received. For example, the client wireless device can automatically connect to the standard access point with the best quality of service without any user involvement.

Example 18

Exemplary User Interface for Connecting to Standard Access Points

Figure 8:
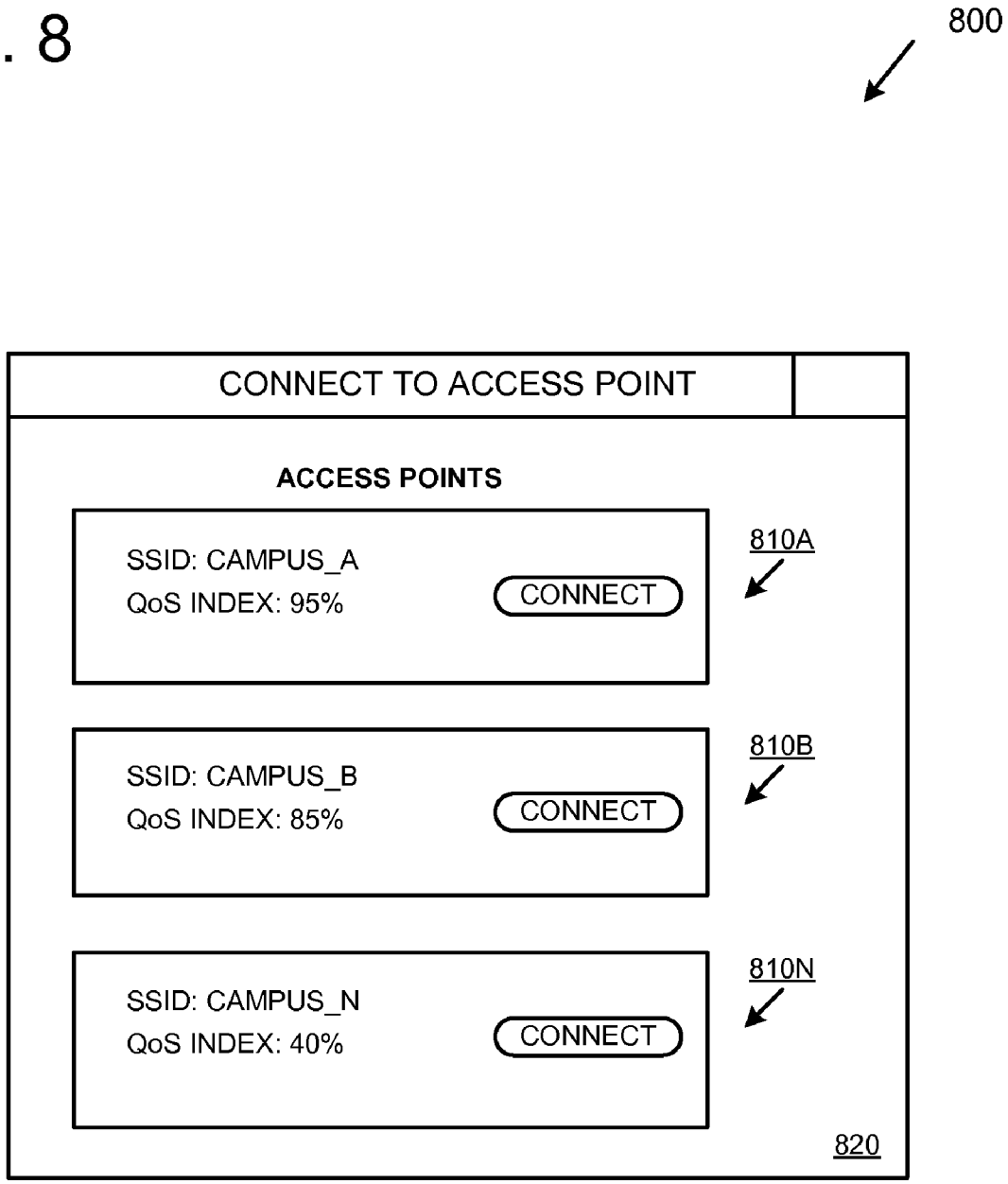
FIG. 8 is a diagram showing an exemplary user interface connecting to standard access points based on quality of service information.

FIG. 8 shows an exemplary user interface 800 depicting standard access points and can be used for connecting to a standard access point based on quality of service information. The user interface 800 can be displayed, for example, by client wireless devices after the client wireless device has received quality of service information regarding standard access points via a method such as that described in FIG. 7.

In the user interface 820, a number of standard access points, 810A-N, are displayed. The standard access points are listed in order of best to worst quality of service. For example, standard access point 810A has a quality of service index (or rating) of 95%, standard access point 810B has a quality of service index of 85%, and standard access point 810N has a quality of service index of 40%. A user can select one of the standard access points to establish a connection with (e.g., standard access point 810A, which has the best quality of service index).

The user interface 820 can depict a different number of standard access points. For example, all available standard access points in a particular area (e.g., within range of the client wireless device) can be listed.

A client wireless, upon entering an area served by an open wireless computing network, can receive quality of service information before the client wireless device establishes a connection to the wireless network. For example, the client wireless device can receive quality of service information encapsulated in SSID fields of beacon frames broadcast by a special-purpose access point. The client wireless device can display the user interface 820 allowing a user to select the desired standard access point with which to establish a connection. Alternatively, the client wireless device can automatically connect (e.g., without any user intervention and without displaying the user interface 800) to the standard access point with the best quality of service.

Example 19

Exemplary Computing Environment

Figure 9:
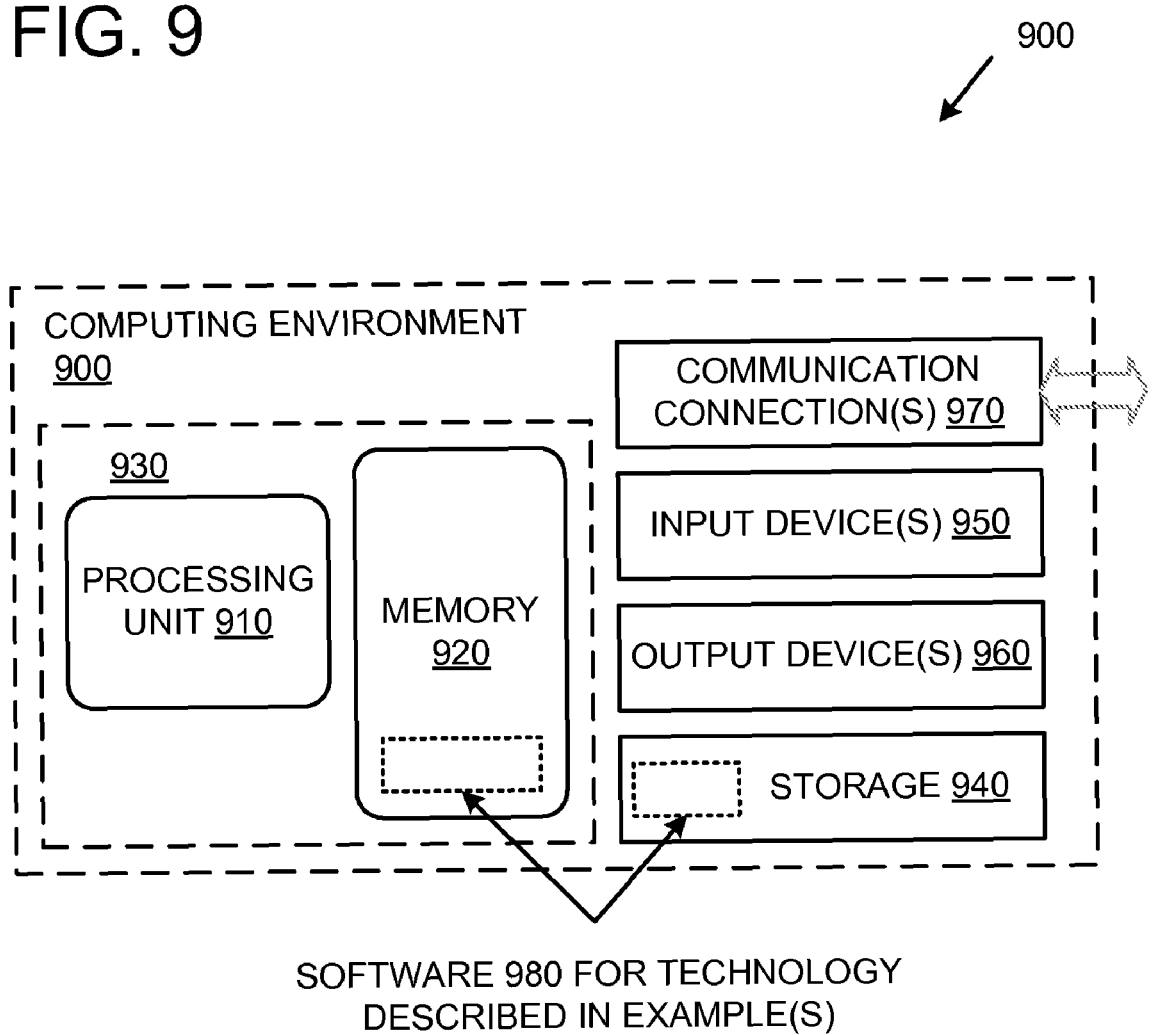
FIG. 9 is a block diagram illustrating an example of a computing environment that can be used to implement any of the technologies described herein.

FIG. 9 illustrates a generalized example of a suitable computing environment 900 in which described embodiments, techniques, and technologies may be implemented. The computing environment 900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, the computing environment 900 includes at least one central processing unit 910 and memory 920. In FIG. 9, this most basic configuration 930 is included within a dashed line. The central processing unit 910 executes computer-executable instructions and may be a real or a virtual processor. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980 that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the software 980, which can implement technologies described herein.

The input device(s) 950 may be a touch input device, such as a keyboard, keypad, mouse, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 900. By way of example, and not limitation, with the computing environment 900, computer-readable media include memory 920, storage 940, communication media (not shown), and combinations of any of the above.

Example 20

Exemplary Automated Methods

Any of the methods described herein can be performed via one or more computer-readable media (e.g., storage media) having computer-executable instructions for performing such methods. Operation can be fully automatic, semi-automatic, or involve manual intervention.

Example 21

Exemplary Combinations

The technologies of any example described herein can be combined with the technologies of any one or more other examples described herein.

Example 22

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for connectionless delivery of non-standard frame field information over an open wireless computing network, the method comprising:
    delivering non-standard frame field information by publicly broadcasting the non-standard frame field information within the open wireless computing network, wherein the non-standard frame field information is publicly broadcast in one or more broadcast frames, wherein the one or more broadcast frames are beacon frames, wherein the non-standard frame field information is encapsulated within service set identifier fields of the beacon frames, and wherein the non-standard frame field information is encapsulated in a format within the service set identifier fields within the beacon frames, the format comprising the following fields:
        an information channel field, wherein the information channel field indicates a category, from a plurality of available categories, of non-standard frame field information;
        a number of fragments field;
        a fragment identifier field; and
        a field containing non-standard frame field information;
    wherein the publicly broadcast non-standard frame field information is received by a client wireless device over the open wireless computing network, wherein the client wireless device has not established a connection with the open wireless computing network, wherein the client wireless device detects the non-standard frame field information based, at least in part, on the format of the encapsulated non-standard frame field information, and wherein the client wireless device stores the non-standard frame field information received in the one or more broadcast frames.

2. The method of claim 1 wherein the non-standard frame field information is publicly broadcast in a plurality of broadcast frames, and wherein the client wireless device aggregates and stores the non-standard frame field information received in the plurality of broadcast frames.

3. The method of claim 1 wherein the client wireless device performs at least one of the following functions based at least in part on the non-standard frame field information:
    displays a visual representation of the non-standard frame field information;
    establishes a connection to a standard access point of the open wireless computing network; and
    initiates an alert.

4. The method of claim 1 wherein the non-standard frame field information is publicly broadcast within the open wireless computing network by a special-purpose access point, and wherein the client wireless device automatically receives the publicly broadcast non-standard frame field information from the special-purpose access point when the client wireless device is within a wireless network zone of the special-purpose access point.

5. The method of claim 1 wherein the non-standard frame field information pertains to a plurality of information channels as indicated by the information channel field, wherein one of the plurality of information channels is a quality of service information channel.

6. The method of claim 1 wherein the non-standard frame field information is broadcast within the open wireless computing network by a special-purpose access point, wherein the open wireless computing network is an 802.11 wireless network, wherein the special-purpose access point comprises a standard 802.11 wireless network adapter, and wherein the client wireless device comprises a standard 802.11 wireless network adapter.

7. A computer system for connectionless delivery of non-standard frame field information over an open wireless computing network, the system comprising:
    a quality of service device configured to collect quality of service parameters relating to a plurality of standard access points of the open wireless computing network, wherein the quality of service parameters comprises number of users, load, throughput, and supported services for each of the plurality of standard access points, and wherein the quality of service device calculates a quality of service score for each standard access point from the collected quality of service parameters; and
    a special-purpose access point configured to deliver non-standard frame field information by broadcasting the non-standard frame field information within the open wireless computing network, wherein the non-standard frame field information is broadcast by the special-purpose access point in a plurality of broadcast frames, wherein the plurality of broadcast frames are of a beacon frame subtype of a management frame type, wherein the non-standard frame field information is encapsulated in service set identifier fields of the plurality of broadcast frames, wherein the non-standard frame field information comprises quality of service information, wherein the quality of service information comprises the quality of service scores for each standard access point;

wherein a client wireless device receives the non-standard frame field information broadcast in the service set identifier fields of the plurality of broadcast frames from the special-purpose access point, wherein the client wireless device has not established a connection to the special-purpose access point, wherein the client wireless device aggregates the non-standard frame field information received in the plurality of broadcast frames, and wherein the client wireless device establishes a connection to a standard access point, of the plurality of standard access points, based at least in part on the received quality of service scores.

8. The system of claim 7 wherein the client wireless device performs at least one of the following functions based at least in part on the aggregated information:

displays a visual representation of the aggregated information; and initiates an alert.

9. The system of claim 7 wherein the non-standard frame field information relates to a plurality of information channels, and wherein the special-purpose access point is further configured to broadcast the non-standard frame field information by multiplexing the plurality of information channels across the plurality of broadcast frames.

10. The system of claim 7 wherein the open wireless computing network is an 802.11 wireless network, wherein the special-purpose access point comprises a standard 802.11 wireless network adapter, and wherein the client wireless device comprises a standard 802.11 wireless network adapter.

11. One or more computer-readable media comprising computer-executable instructions for performing a computer implemented method for connectionless delivery of frame field information over an open wireless computing network, the method comprising:

receiving, by a client wireless device over the open wireless computing network, frame field information broadcast by a special-purpose access point, wherein the frame field information is broadcast by the special-purpose access point in a plurality of broadcast frames, wherein the plurality of broadcast frames are beacon frames, wherein the frame field information is encapsulated within service set identifier fields of the beacon frames, wherein the client wireless device has not established a connection with the special-purpose access point, and wherein the frame field information is encapsulated in a format within the service set identifier fields within the beacon frames, the format comprising the following fields:

an information channel field, wherein the information channel field indicates a category, from a plurality of available categories, of frame field information;

a number of fragments field;

a fragment identifier field; and a field containing frame field information; and aggregating and storing, by the client wireless device, the frame field information received in the plurality of broadcast frames;

wherein the client wireless device detects the frame field information based, at least in part, on the format of the encapsulated frame field information.

12. The one or more computer-readable media of claim 11 wherein the frame field information relates to a plurality of information channels as indicated by the information channel field, wherein one of the plurality of information channels is a quality of service channel.

13. The one or more computer-readable media of claim 11 wherein the frame field information comprises quality of service information relating to a plurality of standard access points of the open wireless computing network, wherein the client wireless device displays the plurality of standard access points along with respective quality of service indications based at least in part on the quality of service information.

14. The one or more computer-readable media of claim 13 further comprising:

connecting, by the client wireless device, to one of the plurality of standard access points.

* * * * *